Patented Oct. 10, 1933

1,930,249

UNITED STATES PATENT OFFICE 1,930,249

PROCESS OF RECOVERING TREATING AGENT FROM SLUDGE

Jacque C. Morrell, Chicago, Ill., assignor to Universal Oil Products Company, Chicago, Ill., a corporation of South Dakota No Drawing. Application December 11, 1931
Serial No. 580,453

3 Claims. (Cl. 196—40)

This invention relates to the recovery of values from sludge or waste chemical treating reagents and refers more particularly to a process for the regeneration of spent reagents that have been used in treating petroleum distillates and their subsequent use as a treating agent.

More specifically the invention has reference to a process for the recovery of values from sludges produced during the vapor phase treatment of cracked distillates with mixtures of sulphuric acid and either inorganic or organic compounds which act as diluting or spacing materials to moderate the action of the acid upon the vapors undergoing treatment and prevent undesirable side reactions and the use of the recovered reagents in a continuous manner as described and for the aforementioned purpose.

An important step in the treatment of cracked distillates has been the development of treating processes which could be applied to the cracked vapors prior to their fractionation for the production of gasoline so that the finished product could be directly produced from the process and the necessity for a rerunning step obviated. The success of such processes that have attained commercial status has in the majority of cases been due to the use of treating reagents whose action was only moderate at the temperatures of the vapors undergoing treatment which in the majority of cases are considerably superatmospheric, even to temperatures as high as 500° F. in case the vapors are under superatmospheric pressure.

Where sulphuric acid has been employed as the vapor phase treating reagent it has been found necessary to employ the equivalent of dilute acid, since the use of the ordinary commercial grades of acid at the temperature of cracked vapors usually causes pronounced oxidizing effects in addition to the action upon the highly unsaturated hydrocarbons and sulphur compounds, these reactions proceeding at times even to the extent of complete reduction of the acid and charring of the hydrocarbons. The use of dilute acids is impracticable under most conditions of operation, since the water is rapidly evaporated until a concentration of acid is reached which is in equilibrium with the water vapor present in the treating equipment, so that ultimately the same effects are produced that would result from the introduction of concentrated acid. To obviate this difficulty I have disclosed in previous copending applications the use of both inorganic and organic compounds in solution with sulphuric acid, the vapor pressure of these solutions being sufficiently low under the average conditions of vapor phase treatment to enable the solutions to be used without material change in concentration other than that produced by the chemical reactions upon the vapors.

In one copending application I have disclosed the use of treating solutions containing sulphuric acid and acid sulfates, particularly the acid sulfates of ammonia and the alkali metals, though the acid sulfates of the alkaline earths and the heavy metals also frequently provide solutions which may be used with beneficial effects.

In other applications I have disclosed the use of sulfuric acid solutions containing organic compounds of an acid, a basic or a substantially neutral character. As examples of organic compounds of a distinctly acid character which may be mixed with sulphuric acid preferably in aqueous solutions such acids as acetic, propionic, butyric, their higher homologues and halogen derivatives as well as their isomers were mentioned. In another application which covered the use of organic compounds of a basic nature that were utilizable in conjunction with sulphuric acid to provide vapor phase treating solutions were mentioned amines, imines, pyridines and similar compounds. The types of organic compounds of a substantially neutral character which were mentioned in the third application included primarily organic compounds that could be relatively easily sulfonated such as benzene, toluene, naphthalene and their chlor, nitro and hydroxyl derivatives. In this class were also enumerated compounds whose state of oxidation was of an intermediate character such as aldehydes and ketones.

In its most specific embodiment the present invention comprises the regeneration and reuse of the spent spaced-sulphuric acid treating reagents such as those described by the following general steps:

1. Separation of aqueous from oily layer;
2. Dilution of aqueous layer with water to effect further separation of the water soluble components;
3. Concentration of the aqueous layer to a definite point e. g. by heating;
4. The replenishment of the solution by the addition of whatever compounds are necessary to restore it to proper composition.
5. Recirculation of the restored reagent back to the treater for reuse; continuously if desired.

In utilizing spaced sulphuric acid treating reagents for the treatment of hydrocarbon oil vapors and particularly cracked vapors, the best method of application is usually to flow the solution downwardly countercurrent to a rising stream of vapors in a tower filled with baffling material to insure thorough contact, the treated vapors being then fractionated to produce a finished gasoline fraction and the liquid accumulations in the treater being separated into an aqueous and an oily layer, the oil being returned to the heating zone of the cracking process if suitable for such retreatment and the aqueous layer recovered according to the process of the invention.

In cases where more advantage is gained by allowing the treating solution to flow downwardly concurrent with vapors undergoing treatment the same general operations are effected.

It will be recognized that owing to the widely varied composition of the spent solutions which may arise as a result of treatments of the character described that the exact details of the recovery steps in regard to temperatures, times, concentrations, etc. will vary correspondingly so that while the general steps may be utilized no exact limits for each can be stated. It may be sufficient at times when solutions of the acid sulphate type have been employed to omit the dilution step prior to the reconcentration on account of the relative insolubility of the products of reaction between sulphuric acid and the hydrocarbon vapors, at other times a considerable dilution may become necessary to separate the undesirable dissolved organic material.

It will be recognized by those familiar with the types of processes producing sludge materials which may be recovered according to the process of the invention that the composition and quantities of the sludges will be extremely variable. In some cases, such as, for example, in cases using inorganic acid sulphates in solution with sulphuric acid, the spacing agent may undergo substantially no change as a result of the treatment whereas the sulphuric acid, being the active constituent, may be more or less completely consumed, and appear in organic compounds of the same general types as are encountered in the sludges from liquid phase refining operations on petroleum fractions, that is, as alkyl sulphates, sulfonic acids, sulfinic acids, sulfones and intermediate reduced sulfoxy compounds of uncertain composition.

The character of the sludges produced when hydrocarbon vapors are treated in vapor phase with sulphuric acid solutions containing organic spacing materials will be of more indefinite composition, since the organic spacing agent itself may at times be partially consumed either by its action upon the vapors undergoing treatment or by the sulphuric acid itself, the spacing agent in such cases acting somewhat as a shield in preventing overtreatment of the vapors.

As an example of an operation of the invention in which the sludge recovered is that resulting from the use of inorganic spacing reagents, the following may be cited. Cracked vapors may be treated at a temperature of approximately 300° F. by running a "spaced" sulfuric acid solution downwardly countercurrent to an ascending stream of the vapors. The solution used may have the following composition in parts by weight:

|  | Per cent |
|---|---|
| Sulfuric acid | 52.6 |
| Ammonium sulfate | 21.7 |
| Water | 25.7 |

The use of this solution in the manner described at the rate of approximately 10 lbs. of solution per bbl. of condensed gasoline may result in the consumption of approximately 75% of the sulfuric acid, there being substantially no effect upon the ammonium sulfate so that the aqueous layer separated from supernatant oil and reaction products may have the following composition by weight:

|  | Per cent |
|---|---|
| Sulfuric acid | 21.8 |
| Ammonium sulfate | 35.7 |
| Water | 42.5 |

In some cases, with the use of a mixture such as the above, there may be no necessity for diluting the solution for the effective separation of reaction products on account of the presence of relatively large quantities of ammonium sulfate so that the solution may be regenerated for use either intermittently or continuously by the mere addition of the required amount of sulfuric acid to bring it to its initial composition. However, when required, it is subjected to the recovery treatment and reused.

An example of the use of the invention in recovering a sludge resulting from the use of sulfuric acid containing an organic spacing reagent is furnished in the case of a treatment conducted by using a solution of sulfuric acid containing benzene sulfonic acid, the initial treating solution having the following composition in parts by weight:

|  | Per cent |
|---|---|
| Sulfuric acid | 45 |
| Benzene sulfonic acid | 35 |
| Water | 20 |

In a treatment conducted upon cracked gasoline vapors from a plant operating upon Mid-Continent residuum in which this solution is used in an amount equivalent to approximately 8 lbs. per bbl. of condensed gasoline the sulfuric acid present may be used up to the extent of 80% and the benzene sulfonic acid to the extent of approximately 17%, giving a sludge whose separated aqueous layer has the following approximate composition in percent by weight:

|  | Per cent |
|---|---|
| Sulfuric acid | 15.3 |
| Benzene sulfonic acid | 50.8 |
| Water | 33.9 |

In this case it may be necessary to dilute the sludge with water and heat to an elevated temperature, say, 180° F., to assist in agglomerating tar particles after which the clear aqueous layer may be concentrated by evaporation and brought back to a condition for use by the addition of required amounts of acid and spacing agent.

The reuse of the recovered materials gave results comparable to the original material when employed as a refining agent for cracked hydrocarbons in the vapor phase.

I claim as my invention:

1. In the vapor phase refining of hydrocarbon oils by treatment with sulphuric acid containing a spacing agent, the method of obtaining a refining solution from the sludge produced by said treatment which comprises separating the sludge into an oily layer and an aqueous layer containing a substantial portion of the spacing agent, and adding fresh sulphuric acid to said aqueous layer.

2. In the vapor phase refining of hydrocarbon oils by treatment with sulphuric acid containing a spacing agent, the method of obtaining a refining solution from the sludge produced by said treatment which comprises separating the sludge into an oily layer and an aqueous layer containing a substantial portion of the spacing agent, concentrating the aqueous layer by heating, and adding fresh sulphuric acid to the concentrated aqueous layer.

3. In the vapor phase refining of hydrocarbon oils by treatment with sulphuric acid containing an organic spacing agent, the method of obtaining a refining solution from the sludge produced by said treatment which comprises separating the sludge into an oily layer and an aqueous layer containing a substantial portion of the spacing agent, diluting the aqueous layer with water to separate undesirable dissolved organic material, then concentrating the aqueous layer, and adding fresh sulphuric acid to the concentrate.

JACQUE C. MORRELL.